United States Patent [19]
Michellone et al.

[11] 3,773,364
[45] Nov. 20, 1973

[54] BRAKE CONTROL METHOD AND APPARATUS

[75] Inventors: Giancarlo Michellone, Cambiano; Mario Palazzetti, Turin, both of Italy

[73] Assignee: Fiat Societa per Azioni, Turin, Italy

[22] Filed: Dec. 31, 1970

[21] Appl. No.: 103,092

[52] U.S. Cl. ............................. 303/21 P, 303/20
[51] Int. Cl. ........................................ B60t 8/12
[58] Field of Search ................... 188/181; 303/20, 303/21; 317/5; 318/52; 324/160–162; 340/262–263

[56] References Cited
UNITED STATES PATENTS

| 3,401,984 | 9/1968 | Williams et al. | 303/21 BE |
| 3,467,443 | 9/1969 | Okamoto et al. | 303/21 BE |
| 3,498,682 | 3/1970 | Mueller et al. | 303/21 BE |
| 3,556,610 | 1/1971 | Leiber | 303/21 P |
| 3,584,921 | 6/1971 | Crawford | 303/21 BE |
| 3,017,145 | 1/1962 | Yarber | 303/21 BE |
| 3,524,685 | 8/1970 | Harned et al. | 303/21 BE |
| 3,635,530 | 1/1972 | Packer et al. | 303/21 P |
| 3,647,267 | 3/1972 | Scharlack | 303/21 P |

FOREIGN PATENTS OR APPLICATIONS

| 1,810,163 | 7/1970 | Germany | 303/21 BE |

*Primary Examiner*—Milton Buchler
*Assistant Examiner*—Stephen G. Kunin
*Attorney*—Sughrue, Rothwell, Mion, Zinn & Macpeak

[57] ABSTRACT

The anti-skid braking system utilizes a speed detector to provide a first signal corresponding to the angular speed of the wheel. This signal is differentiated and then applied to a threshold circuit to obtain a pulse for controlling a valve to govern the release of the hydraulic brake. The output pulse from the threshold circuit is also applied to a control circuit which receives as input, a signal corresponding to the vehicle deceleration and the wheel feed signal. The output of the control circuit is compared with the wheel speed signal in a comparing circuit, the output of which is applied to a flip-flop circuit to reset the flip-flop circuit and allow the control valve to reapply the brakes.

2 Claims, 5 Drawing Figures

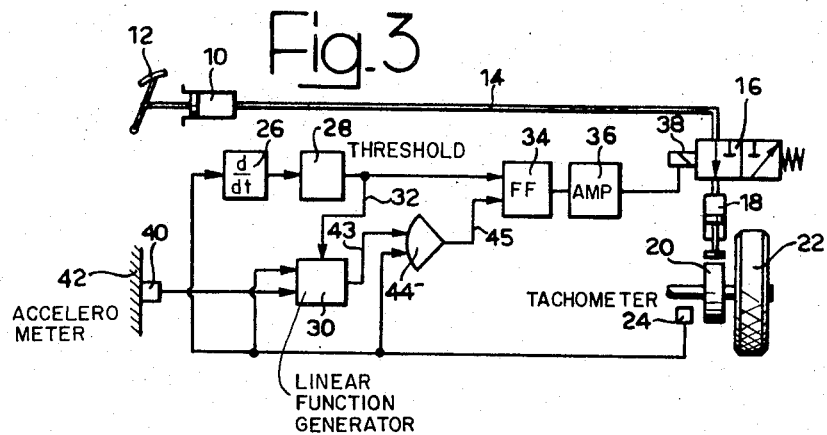
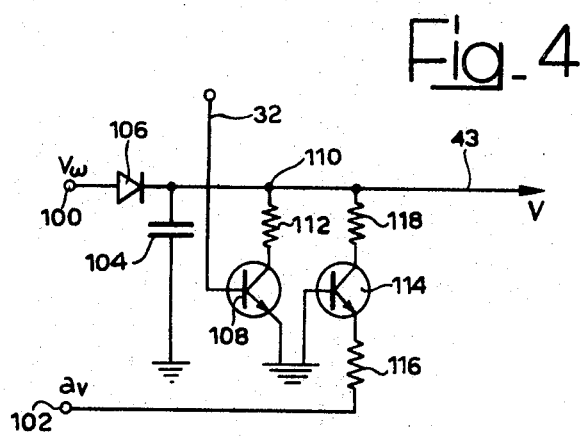
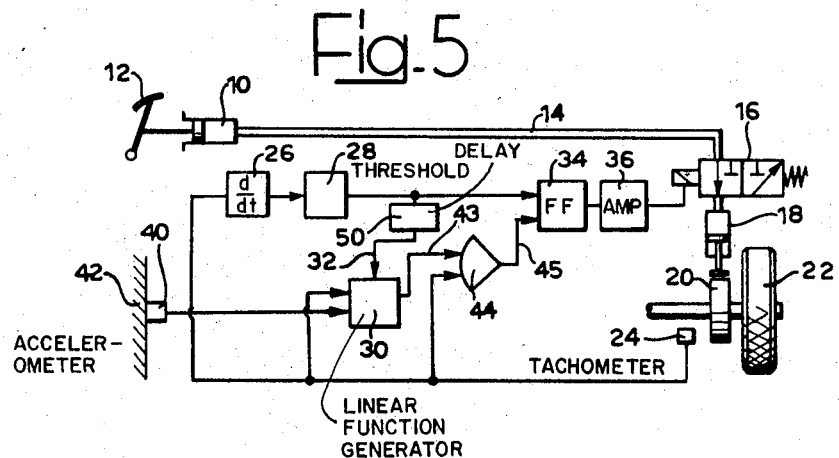

BRAKE CONTROL METHOD AND APPARATUS

This invention relates to a method of anti-skid braking of a vehicle, and to apparatus for carrying out this method.

A fundamental problem in anti-skid braking is to ensure timely and prompt release and also resumption of braking, in order to ensure on the one hand that release is not delayed until the grip and lateral hold of the vehicle have decreased excessively, and on the other hand to ensure that the braking force (i.e., the force exerted between the wheel and the road, tending to brake the wheel) will not have become too small before braking is resumed.

Methods of anti-skid braking are known. Although some produce the required early release, they are generally subject to defects regarding the resumption of braking, in that they normally initiate resumption when both the braking force and the slip (i.e., an indication of the difference between the vehicle speed and the tangential wheel speed at the point of contact with the road) have reached excessively low values, and when the brake output (i.e., the force of the brakes on the drum or disc of the wheel) has fallen practically to zero. This gives rise to numerous disadvantages, in particular excessive reduction in brake efficiency, intolerable lengthening of the braking distance, and above all excessive jumps in the braking force, with consequent jolting and jerking of the vehicle. This impairs the comfort of the passenger, subjects the structure of the vehicle to undesirable stresses, and can also cause dangerous effects in the steering.

The object of the invention is to avoid these drawbacks by providing an anti-skid method and apparatus which avoid great changes in the braking force during a braking operation, while also increasing the braking efficiency and so reducing the braking distance.

The invention provides a method of anti-skid braking of a vehicle wheel, including the steps of initiating release of braking, allowing the wheel to decelerate under inertia forces and then to accelerate under friction with the road, and thereafter initiating resumption of braking; characterized by ascertaining the value of the slip of the wheel at an instant not earlier than the instant of initiation of release of braking and by resuming braking when the slip of the wheel reaches again such value.

Another aspect of the invention provides an apparatus for the anti-skid braking of a vehicle wheel, including means to initiate release of braking and means to initiate resumption of braking, characterised in that the means to initiate resumption of braking comprise a linear function generator, whose operation is triggered by the means to initiate release of braking, and generating a control signal differing from a signal representing the speed of the vehicle by the value of the slip at the time of triggering, and a comparator having as a first input the control signal and as a second input an actual wheel speed signal, and initiating resumption of braking when its two input signals are equal.

FIG. 3 shows a first embodiment of circuitry to carry the invention into effect;

FIG. 4 is a circuit diagram of a linear function generator which is part of the embodiment of FIG. 3; and FIG. 5 shows a second embodiment of circuitry.

Figure 1:
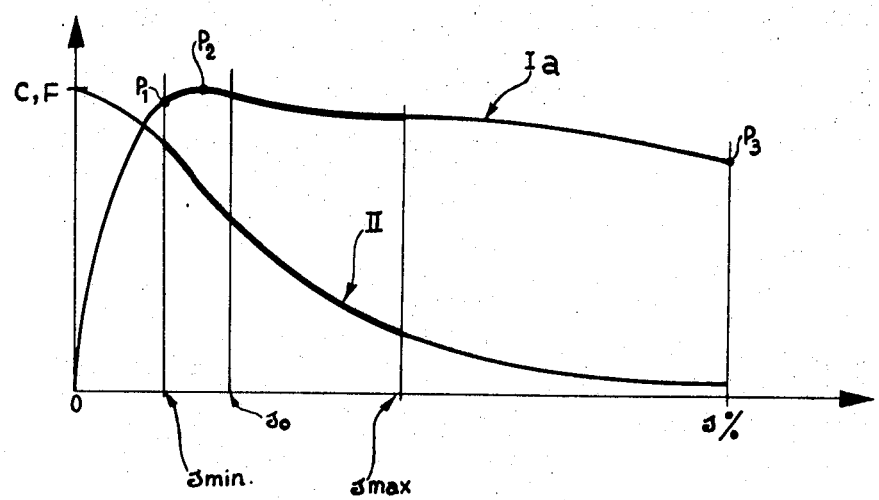
FIG. 1 is a graph showing the braking force C and lateral holding force F of a braked vehicle wheel as functions of the slip $s$.

In FIG. 1, the curve I represents the relationship between braking force C of a wheel plotted along the ordinate axis, and the slip s of the wheel, plotted along the abscissa. The slip is expressed as a percentage, i.e.:

$$s = V_v - V_w/V_v \times 100$$

where $V_v$ is the instantaneous speed of the vehicle and $V_w$ is the instantaneous tangential speed of the wheel at its point of contact with the road. The expression:

$$S = V_v - V_w$$

will be referred to as the absolute slip.

As is well known, the braking force C is proportional to the friction co-efficient $\mu$, being related to it by a factor reflecting the vertical force on the wheel.

The curve I can assume various configurations because it depends on the state of the tyre, the state of the road and the speed of the wheel. The general shape, however, remains substantially the same under the most varied conditions even though the proportions do not. The curve has a first section $O-P_1$ which is substantially linear, then passes more gradually to a maximum at $P_2$ corresponding to a value of $s$ between 10 and 25 percent, and then descends relatively steadily and slowly to a point $P_3$. Finally (not shown) it drops abruptly at slip values close to 100 percent. The final section is not shown because the conditions are unstable and the curve is indeterminate.

The section $O-P_2$ of the curve, in which the slip is between zero and the value corresponding to the maximum braking force, is called the section of pseudo-skid. In this section the tyre tread element or blocks bend, being subjected to shearing stresses, but do not slip. The maximum braking force occurs when the tread elements reach the limit of their grip, after which they cease to cling to the road surface and thus slide over it.

The section of the curve beyond the point $P_2$ is called the skid section. When $s = 100$ percent the wheel is locked and complete skidding occurs.

In FIG. 1, the curve II represents the lateral holding force F, i.e., the force between wheel and road transversely to the direction of travel, as a function of $s$. The force F remains high in the region of pseudo-skid and falls rapidly to zero when $s$ approaches 100 percent. F may be regarded as a funtion of the steerability of the vehicle.

During a braking operation pressure is applied progressively to the brake cylinders. The brake output increases progresssively under the force applied to the brake pedal. The braking force, on the other hand, does not increase progressively beyond the point $P_2$, but decreases. The wheel is therefore strongly retarded in accordance with the relationship:

$$B - C = ka$$

where B is the brake output, C is the braking force, $a$ is the deceleration of the wheel, and $k$ is a constant related to the moment of inertia of the wheel.

In the skid region, the braking efficiency declines and the lateral hold and hence the steerability become progressively worse. The function of an anti-skid system is to sense the state of skidding, i.e., to sense that the wheel has moved into the skid region, and to reduce the pressure in the brake cylinders until the wheel returns to a safer zone. But although there are no serious difficulties in sensing the state of skidding, in the systems hitherto known there is a serious difficulty in ascertaining when a state which will permit resumption of braking has been reached. Usually this state is not ascertained sufficiently early; the brake output rises only after it has fallen practically to zero, and after the wheel has passed rapidly from a state of incipient locking (near the point $P_3$ in the section $P_2$–$P_3$) to a completely free state (near the point O in the section O–$P_1$). This is the cause of the jolts and jerks typical of the anti-skid braking systems known in the past.

Figure 2:
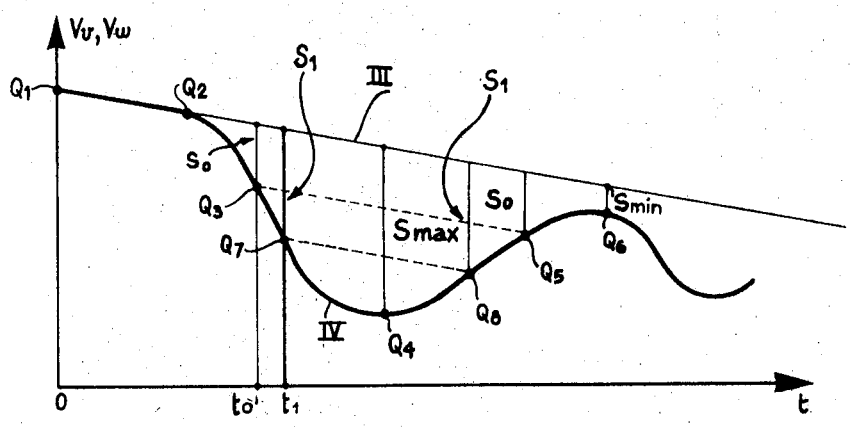
FIG. 2 is a graph showing the speed $V_v$ of a vehicle having an anti-skid device and the speed $V_w$ of a braked wheel of the vehicle as functions of time T.

In FIG. 2, illustrating braking under the action of an anti-skid device, the curve III shows the speed $V_v$ of the vehicle as a function of time T. This curve is substantially linear because the deceleration of the vehicle changes very little during the braking cycle. This stems from the large inertia of the vehicle. The curve IV shows the speed $V_r$ of the braked wheel.

When braking starts, the vehicle and wheel both have the same speed, as shown by the point $Q_1$ on the ordinate axis. The vehicle and wheel decelerate for a time at practically equal rates, as shown by the section $Q_1$–$Q_2$. The action of the brake then causes a progressive deceleration of the wheel relatively to the vehicle in the section $Q_2$ to $Q_3$. At the point $Q_3$, the deceleration of the vehicle reaches a predetermined value at which release of the brake is initiated by the anti-skid device. This point corresponds to a time $t_o$ on the abscissa. Inertia forces inherent in the mechanical and hydraulic system cause the wheel to continue to decelerate for a time after $t_o$, until the wheel speed reaches a low point $Q_4$. Slip is maximum at this point. Friction with the road then causes the wheel speed to rise, and at some point $Q_5$, which will depend on the characteristics of the antiskid device, braking is resumed. The inertia of the system prevents immediate deceleration of the wheel, which continues to increase its speed to a high point $Q_6$, after which it falls again as a result of the braking action. Slip is at its minimum at the point $Q_6$. The process then repeats itself continuously, and in practice with a frequency which may be ten times or more per second, for as long as the brake pedal is depressed by the driver.

According to the invention, point $Q_5$ is chosen to be the point in which the wheel has the same slip value $S_o$ that it had when the braking command was first given at time $t_o$. This will guarantee a prompt resumption of braking, preventing the slip from falling below a predetermined value $S_{min}$.

If resuming braking at point $Q_5$ is not early enough, owing for instance to a rather long delay in the hydraulic system, an earlier resumption command can be given by choosing a resumption point $Q_8$ at a slip value equal to a slip $S_1$ of the wheel at a time $t_1$ delayed by a chosen interval $\Delta t = t_1 - t_o$ with respect to the time $t_o$.

The value $S_{min}$ is therefore always under control. Although relative slip has been considered with respect to FIG. 1 and absolute slip has been considered with respect to FIG. 2, the recited considerations are practically valid for both in the present application, because they differ by a factor $V_v$, the vehicle speed signal, which varies very little during the short time of a cycle of operation of the antiskid system.

In FIG. 3 a master cylinder 10 operated by a brake pedal 12 is connected by a tube 14 to an inlet port of a solenoid operated three way, two position normally open valve 16. Valve 16 normally connects tube 14 to a brake cylinder 18. The brake cylinder 18 is adapted to operate a brake 20 of a road wheel 22 of a vehicle (not shown).

A tachometer 24 senses the speed of the wheel 22 and supplies an electrical speed signal to a differentiating circuit 26 which in turn feeds a wheel acceleration signal to a threshold circuit 28. The threshold circuit 28 is connected to supply, when its input signal exceeds a negative predetermined value, a triggering signal to a linear function generator 30, which will be further described later, through a conductor 32. The output signal of the threshold circuit 28 also sets a flip-flop 34, whose output signal is amplified by a power amplifier 36 and energizes the solenoid 38 of valve 16.

The linear function generator 30 receives as inputs both a vehicle acceleration signal from an accelerometer 40 installed on the vehicle 42 and the wheel speed signal from tachometer 24. When it is triggered by the output signal of the threshold circuit 28, the linear function generator 30 starts generating a signal $V^v$ according to the relation:

$$V^v = V_{wo} + a_v (t - t_o) \qquad (1)$$

where $t$ is the time, $t_o$ is the time at which the triggering signal is applied, $a_v$ is the vehicle acceleration signal and $V_{wo}$ is the wheel speed signal at time $t_o$.

The output signal $V^v$ of the linear function generator 30 is supplied through a conductor 43 to one of the inputs of a comparator circuit 44, having as its second input the wheel speed signal from tachometer 24. The comparator circuit 44 supplies a resetting signal through a conductor 45 to the flip-flop 34 when both its input signals are equal.

FIG. 4 shows a circuit diagram of a possible construction of the linear function generator 30. The wheel speed signal $V_w$ and the vehicle acceleration signal 102 (which latter will always be negative during operation of the circuit) are supplied to inputs 100 and a, respectively. The signal $V_w$ feeds a shunt capacitor 104 through a diode 106. A normally conducting transistor 108 normally holds at a low voltage value the point 110 through a resistor 112. The base of the transistor 108 which is connected to the output 32 of the threshold circuit 28 (FIG. 3). A control circuit includes a transistor 119 in common base configuration has its emitter connected through a resistor 116 to point 102, while its collector is connected through a resistor 118 to point 110.

Resistor 118 and capacitor 104 form together an integrating network for signal $a_v$, but, due to the normally conducting transistor 108, no signal is present on conductor 43 for the comparator 44 (FIG.3).

When a triggering signal is applied to the base of transistor 108 at time $t_o$, this transistor will be cut off, thus allowing the integrating network 118, 104 to integrate. Because the capacitor will be charged to a voltage $V_{wo}$, the output signal on conductor 43 will be:

$$V^v = V_{wo} + a_v (t - t_o).$$

The operation of the system of FIG. 3 will be now explained. When the brake pedal 12 is depressed, pressure is applied to the brake cylinder 18 through the normally open valve 16 to brake the wheel 22. If the deceleration of the wheel 22 falls below a predetermined value indicating that the wheel is in an incipient locking condition, the threshold circuit 28 will set flip-flop 34, whose output voltage then goes high, thus energizing solenoid 38 and the valve 16 will then shut off tube 14, and will connect the brake cylinder 18 to exhaust, thus releasing the braking action on the wheel 22.

At the same time, the output signal of the threshold circuit 28 will trigger the linear function generator 30 into operation, thus causing it to apply a signal $V^v$ to comparator 44, according to the relation:

$$V^v = V_{wo} + a_v (t-t_o) \quad (1)$$

Because the acceleration $a_v$ of the vehicle is practically constant, due to the high inertia of the vehicle, during the short time of one cycle of operation of the antiskid system, the relation (1) is equivalent to:

$$V^v = V_{wo} + a_{vo} (t-t_o) \quad (2)$$

where $a_{vo}$ is the acceleration of the vehicle at time $t_o$. Relation (2) is the equation of line $Q_3$–$Q_5$ of FIG. 2, and can be written:

$$V^v = V_{wo} + V_v - V_{vo} \quad (3)$$

where $V_v$ is the speed of the vehicle and $V_{vo}$ is the speed of the vehicle at time $t_o$. Therefore, one can write:

$$V^v = V_v - S_o$$

where $S_o$ is the absolute slip of the wheel at time $t_o$. The function $V^v$ is therefore a fictitious speed signal running parallel to the actual speed of the vehicle, and differing from it by a term equal to the value of the absolute slip at the time $t_o$ of release of the braking action.

When the actual wheel speed signal $V_w$ from the tachometer 24 and the fictitious wheel speed signal $V^v$ from the linear function generator 30 are equal, that is, when the speed accelerates back to the slip value it had at the moment of brake release, the comparator 44 resets the flip-flop 34, thus removing the energizing power from the valve 16 and restoring the braking action on the wheel 22.

If it is required to restore the braking action for a larger value of slip, $S_1$, the embodiment of the system according to FIG. 5 is used. This embodiment differs from the one in FIG. 3 in the provision of a delay circuit 50 in the conductor 32 connecting the threshold circuit 28 to the linear function generator 40. The delay circuit 50 provides a delay time $\Delta t = t_1 - t_o$ between the time $t_o$ of braking release and the time $t_1$ at which the linear function generator 40 is triggered. Therefore, the output signal of the linear function generator 40 will follow line $Q_7$–$Q_8$ in FIG. 2, according to the relation:

$$V^* = V_{w1} + a_v(t-t_1) \cong$$
$$= V_{w1} + V_v - V_{v1} =$$
$$= V_v - S_1$$

where $V_{w1}$, $V_{v1}$, $S_1$ are the values of the wheel speed signal, of the vehicle speed signal and of the absolute slip, respectively, at time $t_1 = t_o + \Delta t$.

What we claim is:

1. An anti-skid system for a vehicle wheel comprising a source of pressure, a wheel brake, valve means for interconnecting said pressure source and said brake to control the application and release of said brake, an electronic device for controlling said means comprising a speed detector for delivering a first signal corresponding to the angular speed of the wheel, a circuit receiving said first signal for delivering a further signal corresponding to the acceleration or deceleration of the wheel, a threshold circuit for producing a pulse when said signal exceeds a predetermined value, a flip-flop circuit energized by said pulse for energizing a power circuit for controlling said valve means, an accelerometer for producing a third signal corresponding to the acceleration or deceleration of the vehicle, a processing circuit having a first input for receiving said first signal and a second input for receiving said third signal, a condenser between said first input and ground, a transistor with a grounded base connected between said first and second input and a control circuit for controlling the operation of said processing circuit upon receiving said pulse in a comparing circuit connected between said processing circuit and said flip-flop circuit for comparing the output of said processing circuit and said first signal for producing a flip-flop de-energizing signal when said two signals applied to the comparing circuit are equal.

2. A system as set forth in claim 1 wherein said control circuit includes a delay line.

* * * * *

UNITED STATES PATENT OFFICE
CERTIFICATE OF CORRECTION

Patent No. 3,773,364            Dated November 20, 1973

Inventor(s) Giancarlo MICHELLONE, et al

It is certified that error appears in the above-identified patent and that said Letters Patent are hereby corrected as shown below:

The claim of priority has been omitted.
    Italian Patent Application Serial No. 6 7085-A/70,
    filed in Italy on January 13, 1970.

Signed and sealed this 16th day of April 1974.

(SEAL)
Attest:

EDWARD M. FLETCHER, JR.          C. MARSHALL DANN
Attesting Officer                  Commissioner of Patents